US 6,595,835 B2

(12) United States Patent
Gadbois

(10) Patent No.: US 6,595,835 B2
(45) Date of Patent: Jul. 22, 2003

(54) CD REFACING SYSTEM

(75) Inventor: Ronald Gadbois, Douglas, MA (US)

(73) Assignee: AVS Supply, Inc., Phoenix, AZ (US)

( * ) Notice: Subject to any disclaimer, the term of this patent is extended or adjusted under 35 U.S.C. 154(b) by 0 days.

(21) Appl. No.: 09/902,322

(22) Filed: Jul. 10, 2001

(65) Prior Publication Data

US 2002/0146969 A1 Oct. 10, 2002

Related U.S. Application Data

(63) Continuation-in-part of application No. 09/613,973, filed on Jul. 11, 2000.

(51) Int. Cl.7 ................................................ B24B 7/00
(52) U.S. Cl. ........................ 451/66; 451/195; 451/285
(58) Field of Search ................................ 451/259, 283, 451/285, 287, 41, 57, 60, 63, 66, 195

(56) References Cited

U.S. PATENT DOCUMENTS

| | | | | |
|---|---|---|---|---|
| 5,099,618 A | * | 3/1992 | Schmid .................... 451/150 |
| 5,593,343 A | * | 1/1997 | Bauer ........................ 451/246 |
| 5,674,115 A | * | 10/1997 | Yamashita et al. .......... 451/285 |
| 5,733,179 A | * | 3/1998 | Bauer .......................... 451/41 |
| 5,954,566 A | * | 9/1999 | Bauer ........................ 451/254 |
| 5,954,569 A | * | 9/1999 | Hutchison et al. .......... 451/270 |
| 6,039,637 A | * | 3/2000 | Hutchison et al. .......... 451/271 |
| 6,312,320 B2 | * | 11/2001 | Sato et al. .................. 451/285 |
| 6,322,430 B1 | | 11/2001 | Kennedy et al. ............ 451/287 |
| 2002/0077038 A1 | * | 6/2002 | Stegner ....................... 451/41 |

* cited by examiner

Primary Examiner—M. Rachuba
(74) Attorney, Agent, or Firm—Brian M. Dingman, Esq.; Mirick, O'Connell, DeMallie & Lougee, LLP

(57) ABSTRACT

This invention features a disc refacing system, comprising a rotatable platter for holding a disc thereon, a grinding pad assembly, and a polishing pad assembly. Each pad assembly can be rotated at high speed. Each pad assembly can be alternately engaged with the disc on the platter. The platter and a pad assembly can be alternately engaged and disengaged, to allow a disc to be loaded and unloaded from the platter. There is a source of grinding compound, which can be applied to the grinding pad assembly.

11 Claims, 7 Drawing Sheets

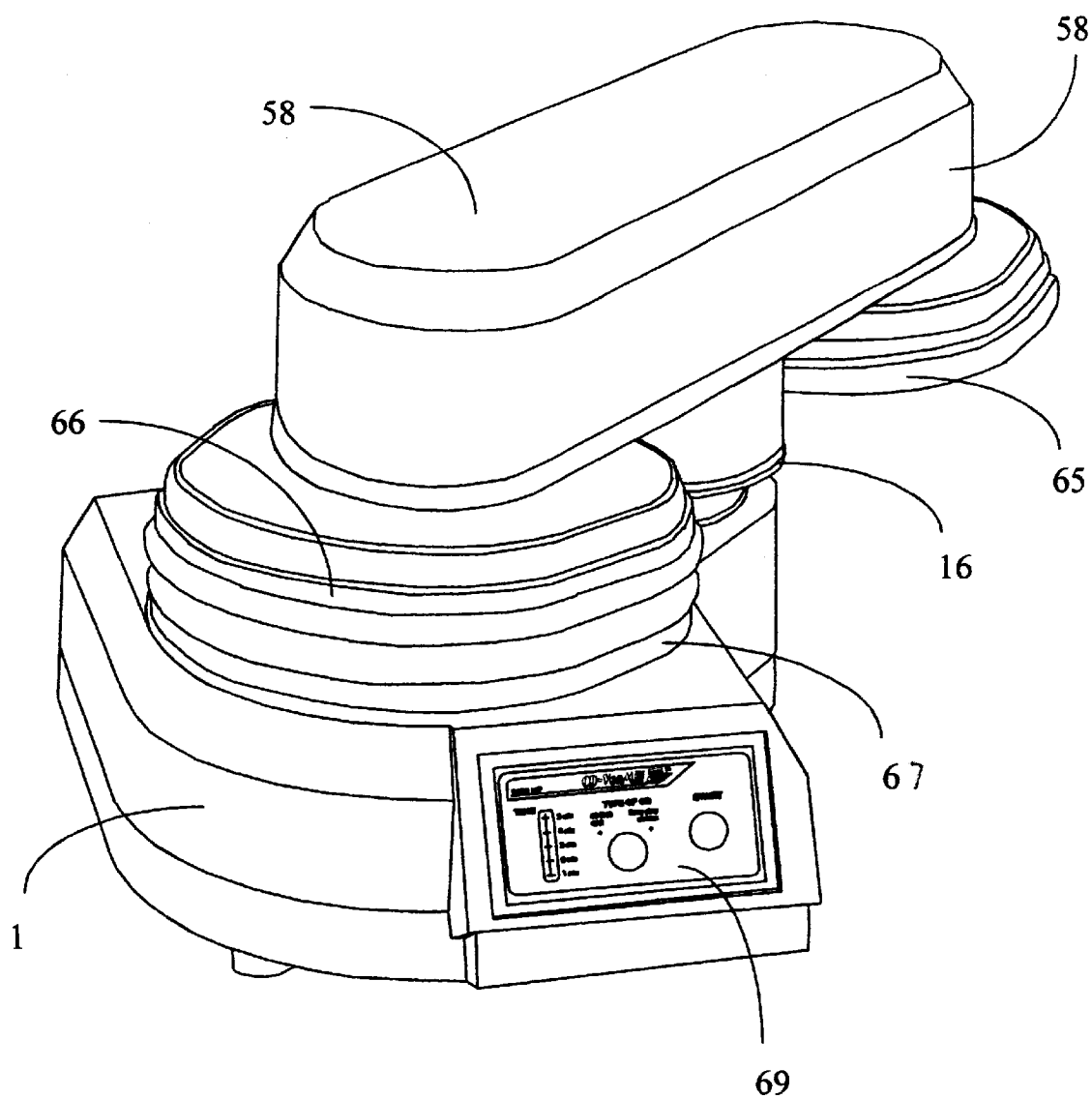
Figure -1-

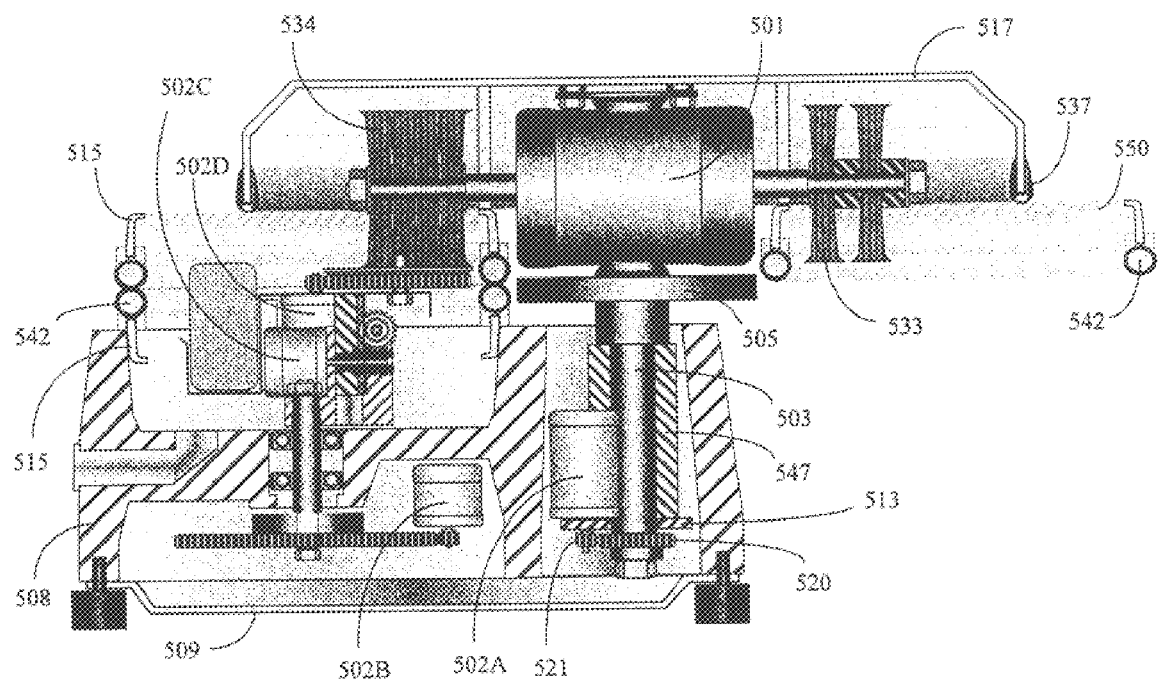
Figure -2-

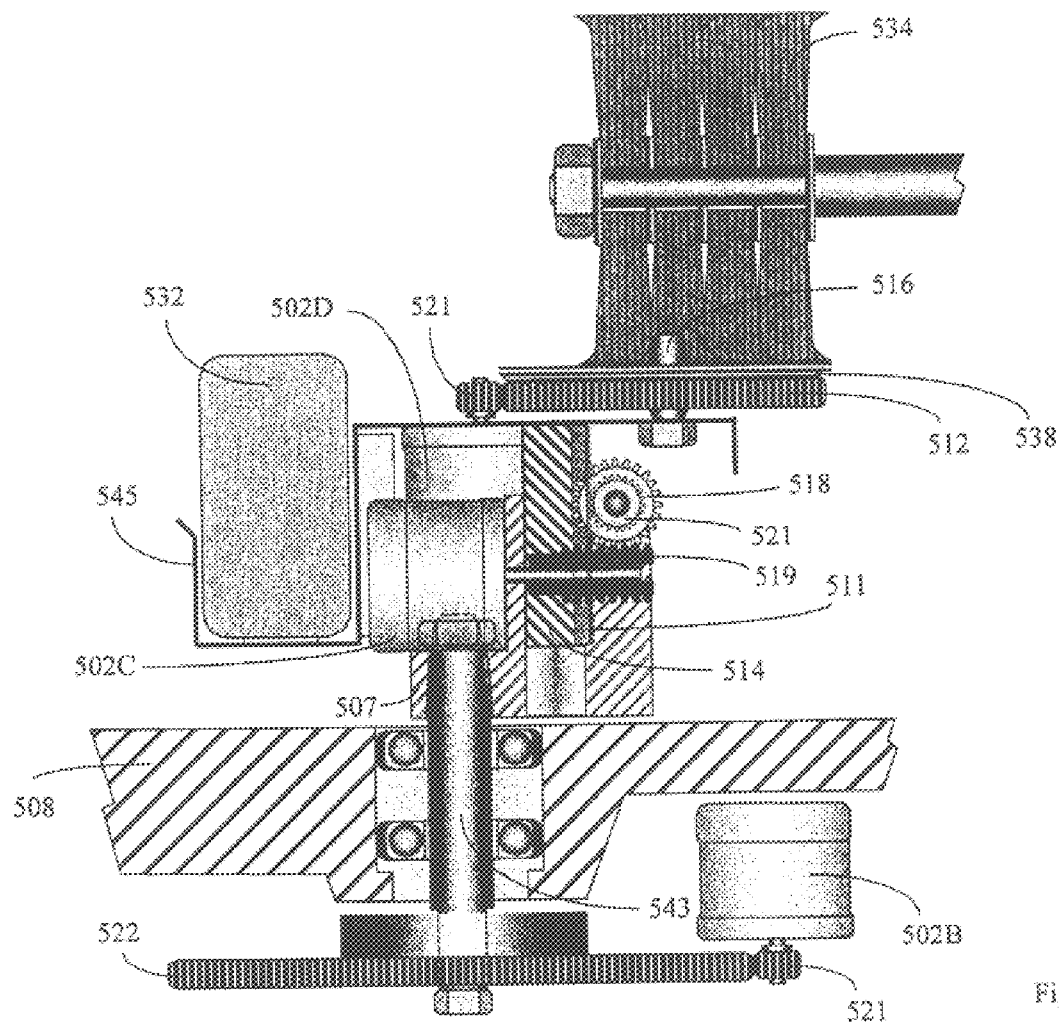
Figure - 3 -

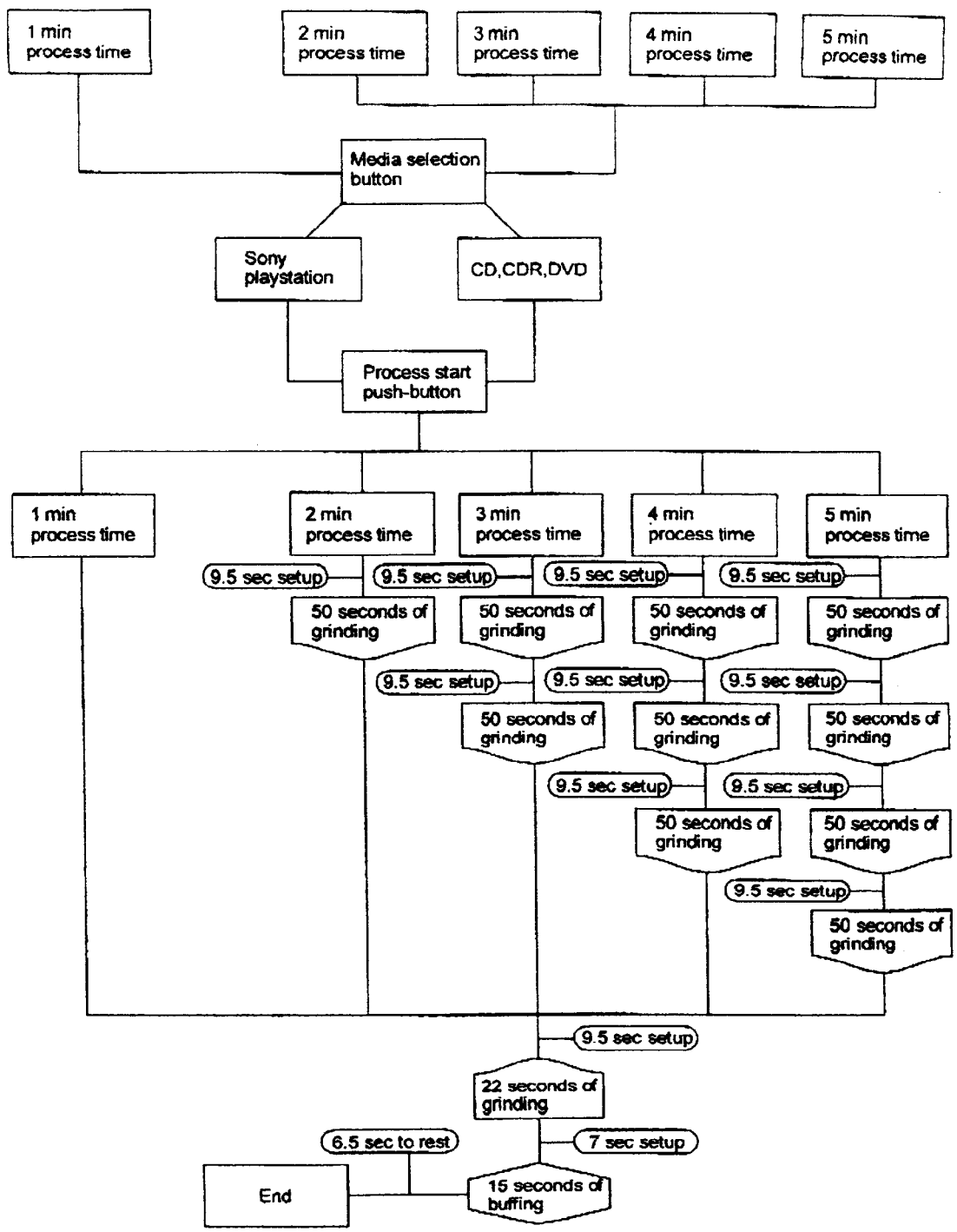
Figure - 4 -

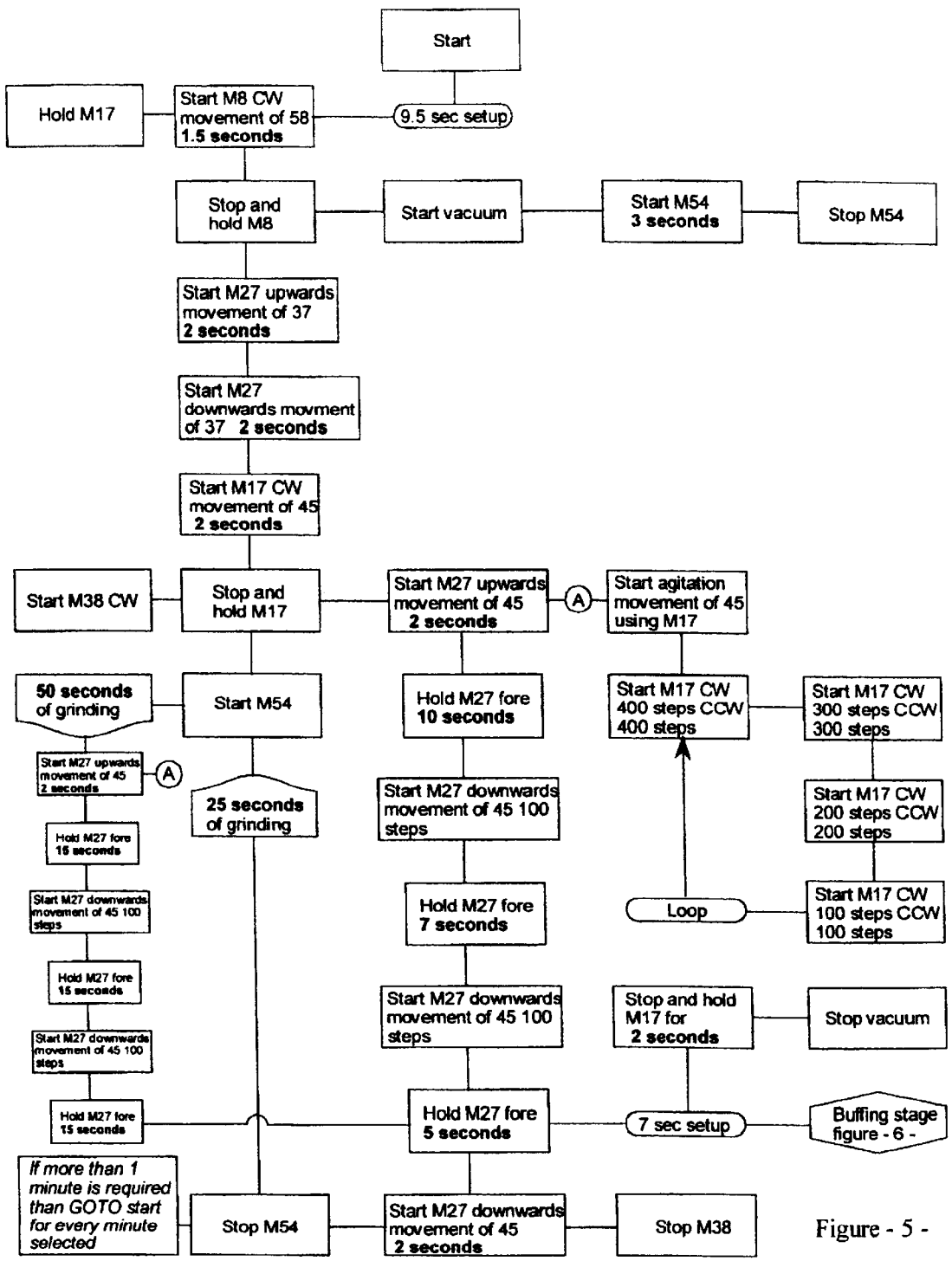
Figure - 5 -

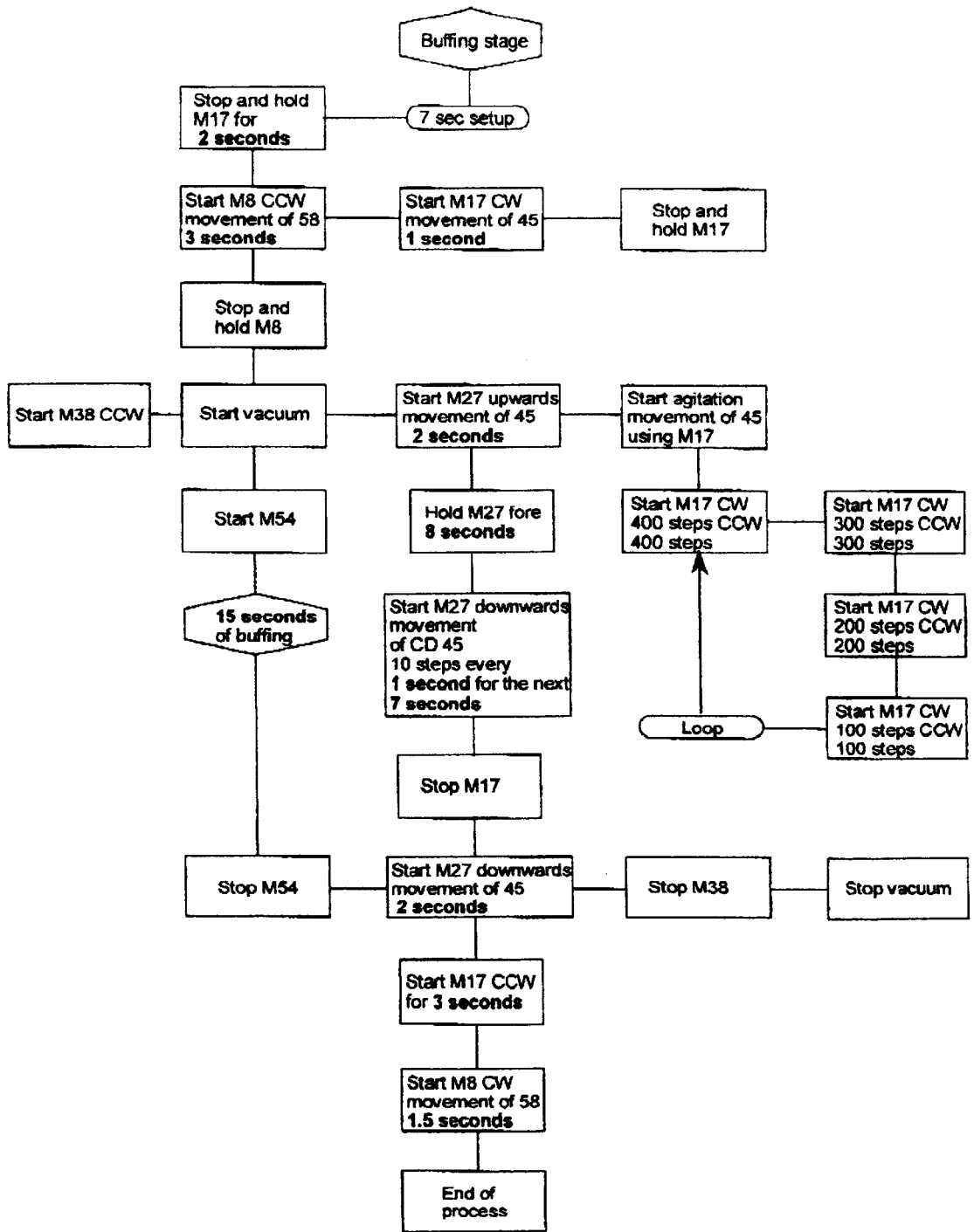
Figure - 6 -

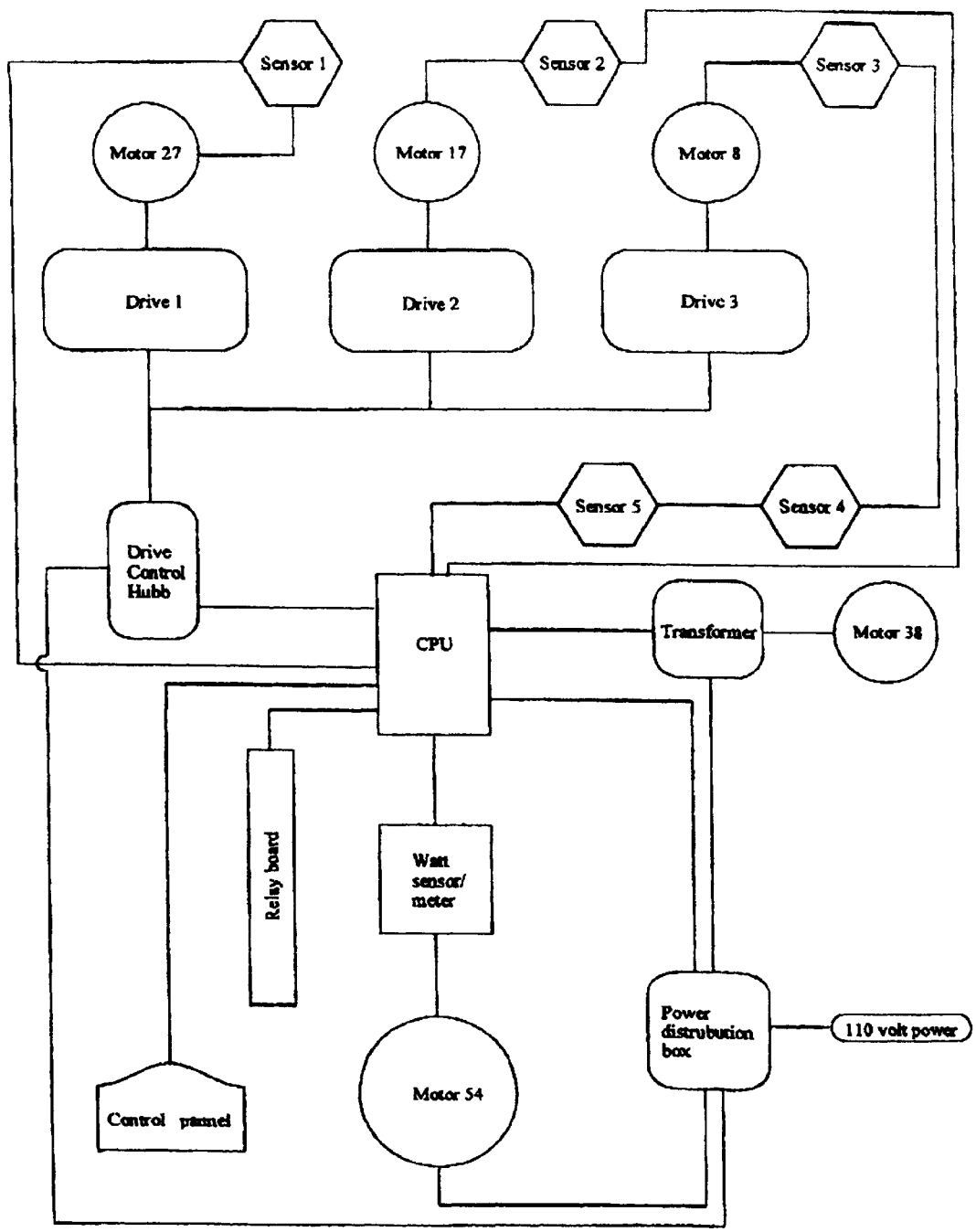
Figure - 7 -

CD REFACING SYSTEM

CROSS REFERENCE TO RELATED APPLICATION

This application is a continuation in part of Ser. No. 09/613,973, filed on Jul. 11, 2000. Priority is claimed.

FIELD OF THE INVENTION

This invention is accomplished with a machine that automatically repairs compact discs (CDs) in every format by a grinding or milling process on the optical side of the CD, eliminating optical defects caused by scratches or scuffs. This process will remove several thousandths of an inch from the optical disk surface, allowing the optical surface to be freed from optical defects thus restoring the playability of the CD.

BACKGROUND OF THE INVENTION

Various machines, methods and processes have heretofore been devised and constructed for repairing scratches and scuffs on the optical (non-label) side of a CD or the like. Such scratches and scuffs can interfere with the transmission of the laser through the surface, thus causing data read errors. These machines and techniques generally do not work well, and/or are time consuming, manual operations. For example, it is known to buff CDs by hand using a grinding wheel motor carrying a buffing pad, and using buffing compound. However, this manual technique is expensive due to the amount of labor involved (typically 5 minutes or more per disc).

SUMMARY OF THE INVENTION

This invention is accomplished with a machine that automatically repairs compact discs in every format by a grinding or milling process on the optical side of the CD, eliminating optical defects caused by scratches or scuffs. This process will remove several thousandths of an inch from the optical disk surface, allowing the optical surface to be freed from optical defects thus restoring the playability of the CD.

It is an object of this invention to provide an improved and fully automated way to repair scratches and gouges in compact discs, in a convenient and short period of time having no noticeable characteristics of being repaired, whereby the lack of noticeable characteristics would give the CD an indistinguishable new look.

It is another object of this invention to provide an excellent restoration not only through the grinding means of the upper and lower integrally connected portions, but also related to the upper portion of the machine. Specifically, a mechanism designed to buff the optical side of the CD after grinding the CD thus effectively restoring perfect optical clarity and aesthetics.

This invention features a disc refacing system, comprising: a rotatable platter for holding a disc thereon; a grinding pad assembly; a polishing pad assembly; means for rotating each pad assembly at high speed; and means for alternately engaging one such pad assembly with the disc on the platter. The system may further include means for alternately engaging and disengaging the platter and a pad assembly, to allow a disc to be loaded and unloaded from the platter. The system may still further include a source of grinding compound, and means for applying the compound to the grinding pad assembly. The means for rotating each pad assembly may include a single motor with two output shafts, and the means for alternately engaging may then include means for moving the motor. The system may further include means for applying suction around the platter, to remove ground material from the platter area.

In a more specific embodiment, this invention features a disc refacing system, comprising: a rotatable platter for holding a disc thereon; a grinding pad assembly; a polishing pad assembly; means for rotating each pad assembly at high speed; means for alternately engaging one such pad assembly with the disc on the platter; means for alternately engaging and disengaging the platter and a pad assembly, to allow a disc to be loaded and unloaded from the platter; a source of grinding compound, and means for applying the compound to the grinding pad assembly.

BRIEF DESCRIPTION OF THE DRAWINGS

These and other objects and features of the invention will occur to those skilled in the art and shall now be described in relationship to the following drawings, in which:

FIG. 1 is a front elevational view of the first preferred embodiment of the invention.

FIG. 2 is a full cross sectional perspective view of the embodiment of FIG. 1.

FIG. 3 is a full cross sectional perspective view of the internal mechanical characteristics of the lower portion of the embodiment of FIG. 1.

FIG. 4 is a flowchart of the operating process of the embodiment of FIG. 1.

FIG. 5 is a flowchart of the grinding process of the embodiment of FIG. 1.

FIG. 6 is a flowchart of the buffing process of the embodiment of FIG. 1.

FIG. 7 is a hardware block diagram of the embodiment of FIG. 1.

DETAILED DESCRIPTION OF THE PREFERRED EMBODIMENTS OF THE INVENTION

Identical parts will be given identical numbers throughout the figures.

FIG. 1 illustrates the first preferred embodiment of the CD repair machine of this invention, which includes a lower portion 1 comprised of a metal casting which includes a face plate portion 69, and the rubber ring portion 67. Upper portion 58 is made of a fiber glass composite, and also includes rubber ring portions 65 and 66. Upper portion 58 is integrally connected to lower portion 1 by means of portion 16.

FIG. 2 illustrates the CD repair machine in a full cross sectional perspective view. Base 1 is comprised of a fiber metal cast which weighs eighty-five pounds, which provides for stability of the machine. Base 1 also provides a bottom chamber 5, adjacent to a cylindrical chamber 4, and also an upper vacuum chamber 6, which also includes an exhaust port 7 to which a vacuum source (not shown) is coupled.

Base 1 is also the structural medium for fastening all components in the lower portion of the CD repair machine. There exists a bottom cover plate 2 connected to base 1 by means of screws, not shown. Parts 3 are rubber pads with a bolting means to connect the pads to base 1. There are four such pads 3 strategically placed, for the specific purposes of anti-vibration, anti-slip and leveling base 1.

Generally cylindrical chamber 4 is designed to house a plurality of parts which effectively form the mechanisms fastening the upper part, and driving the upper part of the machine. In cylindrical chamber 4 there stands vertically a stepper motor 8, which is fastened by means of bracket 9. Motor 8 drives motor shaft 10 which drives primary gear 11, which meshes into secondary gear 12 at a gear ratio of eight to one. Secondary gear 12 is connected to vertical shaft 13, which is connected by fastener nut 14. Shaft 13 is held in place by tubular housing 15 which is fastened by means of bracket 9, which is connected to base 1. Vertical shaft 13 extends up, protruding above base 1. Circular motor mounting plate 16 is connected to the upper portion of shaft 13 by means of a bolt assembly, not shown. Motor 8 turns the upper portions so that either pad set 47 or pad set 51 contacts CD 45.

Bottom chamber 5 is designed to house a plurality of parts, which effectively forms the mechanism that controls the rotation and positioning of the internal mechanisms housed in vacuum chamber 6. These mechanisms, including parts 17, 27 and 38 of FIG. 2, will be described in detail below.

FIG. 3 is a full cross sectional perspective view of the internal mechanical portions of the lower portion of the machine, more specifically, the mechanisms residing in lower chamber 5 and upper vacuum chamber 6 of FIG. 2. To begin with in FIG. 3, there stands vertically a two-inch stepper motor 17, which is fastened to base 1 by means of a bracket, not shown. Motor 17 drives motor shaft 18 which drives primary gear 19, which meshes into secondary gear 20 at a ratio of twenty to one. Secondary gear 20 is connected to vertical shaft 21, which is connected by fastener nut 22. Shaft 21 is supported by bearing assembly 23 which is stationed in base 1 between lower chamber 5 and upper vacuum chamber 6 of FIG. 2. These portions of bottom chamber 5 effectively form the mechanism that controls the rotation and positioning of the internal mechanisms housed in vacuum chamber 6.

Vertical shaft 21 extends up, protruding above the base 1. At the receiving end of the upper portion of the shaft 21, there exists a tapered area of the shaft for the specific means of mounting mechanical lift housing 25. Mechanical lift housing 25 is compression fitted along the tapered shaft 24, using fastener nut 26.

The next set of mechanisms housed in vacuum chamber 6 of FIG. 2, effectively provides a means to apply dry solid grinding compound 37 to the plurality of pads 47, and also a means to mechanically lift the compound block 37 to the desired elevation, to achieve proper compound distribution onto pads 47. Elevation is also used to produce desired contact and proper pressure between the CD 45 and the pads 47 to produce a grinding effect. There is also a mechanism provided through motor 38 to provide rotational motion to gear pad 41, effectively spinning CD 45. The detailed workings of these aforementioned parts and mechanisms housed in vacuum chamber 6 of FIG. 2 are described below.

In FIG. 3 there exists a horizontal two-inch stepper motor 27. Motor 27 is fastened to mechanical lift housing 25. Motor 27 is specifically designed to provide vertical lift, thus motor 27 drives shaft 28 which drives primary worm gear 29, which meshes with secondary worm gear 30 at a ratio of ten to one. Secondary worm gear 30 is corrected to shaft 31, which drives end gear 32 at the ratio of two to one. End gear 32 meshes against racked gear 33 which is connected and housed in shaft 34 which is encased in the mechanical lift housing 25. Thus when all these mechanisms are put into motion, they apply a geared force to push shaft 34 upwards or downwards to achieve elevational change applied to platform 36, by direct contact with shaft 34. This will allow platform 36 to have vertical movement for the specific purpose of loading compound 37 onto pads 47. Also, this will allow platter gear 41 to have elevational characteristics to apply sufficient force and contact to CD 45 against pads 47, effectively causing a grinding process, and allowing a CD to be placed on or removed from the platter. Motor 27 and the described gearing can be replaced by pneumatic motor that can directly accomplish the desired motion as well as the necessary variable upward force.

In FIG. 3 there also is shown a second vertical motor 38. This three-inch AC motor, which is fixed to platform 36, drives shaft 39 which powers primary gear 40. Gear 40 meshes with secondary platter gear 41 at a ratio of eight to one, effectively causing secondary platter gear 41 to have a rotational speed of approximately two hundred and sixty rpm. Secondary platter gear 41 has a half-inch press bearing, not shown, which is pressed onto pin shaft 42. The pin shaft 42 is directly connected to platform 36 by means of fastening nut 43. Alternatively, motor 38 can be directly connected to gripping platform 44 and run at a speed sufficient to spin the CD at the appropriate rotational speed. The center pin 42 affixed on platter gear 41 is a means to fit circular silver impregnated conductive silicone rubber gripping platter 44. The gripping rubber platter 44, is a means to dissipate heat and static from CD 45 caused by the applied grinding process through pads 47. Gripping rubber platter 44 has a thickness of 30 thousandths of an inch.

The plurality of pads 47 are made up of cotton fiber cloths for the purpose of holding compound 37, and are directly connected to motor drive shaft 48. The pads 47 are physically held in place by the washers 49 in between each pad which have been pressed firmly together by assembly nut 50.

Further description will now be continued in FIG. 2 of the upper mechanical portion. Main drive motor 54 is a three-quarter horsepower dual shaft AC 115 V motor. Motor 54 has a lower mounting bracket 55 attached to circular motor mounting plate 16 by a bolt assembly, not shown. Motor 54 also has an upper mounting plate 57 which is attached to the fiber glass composite cover 58 by fastening nuts 57. Motor 54 has drive shaft 48 which drives grinding pads 47 on the left-hand side of motor 54. On the right hand side of motor 54, shaft 48 extends to accommodate two buffing pads 51. Buffing pads 51 are used to bring back the optical clarity of CD 45 after the grinding process. Pads 51 are comprised of fine cotton sheets. Pads 51 are held in place and spaced evenly by means of spacers 52, and washers 49 which have been pressed firmly together by assembly nut 53.

The next paragraph will deal with the description of the upper chambers 61, 65, 66 and 70 which forms the complete upper housing.

The fiber glass composite cover 58 is made to house motor assembly 54 and pads 47 and 51. Cover 58 has two dividers 59, which are attached to lower chambers 66 and 65 by means of a screw assembly, not shown. These dividers 59 along with cover 58 form chambers 61 and 70. A rubber seal 60 is affixed to upper cover 58 to form a tight seal against cover plates 62. Cover plates 62 forms the top portion of chambers 65 and 66, which consists of a ring manifold 63. A rubber compression seal 64 is affixed to the bottom of ring manifolds 63. This completes the lower chambers 65 and 66, to further complete connecting chambers 61 and 70, which in turn completes the assembly chamber for upper motor 54.

Rubber compression seal 64 is designed to compress against lower rubber compression seal 67, which is affixed to lower ring manifold 68, which will complete a full sealed vacuum chamber that includes chambers 6, 66 and 70, respectively. When the entire upper mechanisms of the machine are rotated 180 degrees by motor 8, the buffing side of the process then forms a complete fall sealed vacuum chamber, which comprises chambers 6, 65 and 61, respectively.

FIGS. 4–6 are largely self-explanatory with reference to the remaining drawings, and describe the preferred operation of the preferred embodiment described above. The process times in FIG. 4 are available options (selected by a button push), chosen dependent upon the amount of grinding the operator believes may be necessary to fully remove the scratches and gouges. In each case, buffing takes place for 15 seconds.

The references in FIGS. 5 and 6 beginning with "M" refer to the motor number of the previous drawings. "CW" means clockwise, and "CCW" means counterclockwise.

The grinding unit will have a preset of one-minute process time and will remain on this process timing unless otherwise specified. The second step in the process is to choose the type of media. The selections are: Sony PlayStation is the first selection and the second selection is a CD, CDR, DVD. Once the process time has been selected and the appropriate media selected and the CD has been loaded into the unit, the start button may be pressed.

The next section will describe the mechanisms and processes for a one-minute repair to a CD.

In FIG. 4, the flowchart starts with a one-minute process time block, then media is selected, and then the start button pushed. This will begin the process for one-minute process time which is located beneath block process start pushbutton. The process begins with a grinding process which will be described in FIG. 5.

After the start button has been pressed, a 9.5 seconds set up begins, as follows. Motor 8 starts a counterclockwise movement of approximately 90 degrees, where it will come to rest over the top of chamber 6, completing a sealed chamber by matching up seals 64 and 67. A sensor will be activated which will stop motor 8, then a holding current will be applied to motor 8 to prevent lateral movement. This will take approximately 1.5 seconds. Next, a vacuum is started to produce a down draft force in chamber 6. Simultaneously, motor 54 is started and will continue to operate for three seconds. Also, motor 27 will start, causing upwards movement of compound block 37 for approximately two seconds. This will allow compound 37 to be applied to pads 47, which are being, powered rotationally by motor 54. Then, motor 27 will start downwards movement of compound 37 for approximately two seconds. In the remaining two seconds of the 9.5 seconds set up, motor 17 is started to enact counterclockwise movement of CD 45 approximately one hundred and fifty degrees. This ends the 9.5 seconds set up.

The next section will describe 22 seconds of grinding. A current is applied to motor 17 to prevent any lateral movement. Motor 38 is started in a counterclockwise rotation which effectively turns CD 45 in a clockwise rotation at approximately two hundred and fifty rpm. Motor 54 is then started counterclockwise at approximately 3500 rpm which is driving pads 47 impregnated with compound 37. Motor 27 is started to cause upward movement of CD 45 towards pads 47. This will take approximately two seconds until they have achieved sufficient contact with impregnated pads 47.

The next section will describe the agitation movement of CD 45 using motor 17. Start motor 17 clockwise for 400 steps, or approximately two inches, at a rate of 1 second to traverse the distance, then reversing in direction for 400 steps or approximately two inches at the rate of one second to traverse the distance, then start motor 17 clockwise 300 steps then counterclockwise 300 steps taking approximately 1.5 seconds for both steps, then continue the same process causing an agitation in the range of 200 steps then the range of 100 steps then loop back to 400 steps and continue this process looping for the entire 22 seconds of grinding.

At the beginning of the agitation process, there is also another range of movement taking place. With holding current, hold motor 27 for 10 seconds at the desired elevation for proper grinding contact between pads 47 and CD 45. Start motor 27 exerting downward movement of CD 45 for 100 steps, or approximately ⅛ of an inch. Next, hold motor 27 for seven seconds, then start motor 27, sending CD 45 downwards another 100 steps. Next hold motor 27 for five seconds. This will complete the 22 seconds grinding process.

At this stage, there will be a seven seconds set up to convert over to the buffing segment. The next step is to start motor 27 to apply downwards movement of 45 for approximately two seconds, to rest approximately one inch from rotating pads 47. Simultaneously, stop motor 38, stop motor 54, stop and hold motor 17 for two seconds, and stop the vacuum.

The next section will describe the full buffing process in FIG. 6, which will include a seven second set up, 15 seconds of buffing, and 6.5 seconds to come to rest.

Buffing stage FIG. 6 begins with a seven second set up. Stop and hold motor 17 for two seconds, start motor 8 counterclockwise to affect lateral movement of portion 58 for 180 degrees which will take approximately three seconds. This will effectively create a seal between rubber seals 64 and 67, creating a sealed chamber 6 for CD 45 and the buffing pads 51. Stop and hold motor eight to prevent lateral movement during this process. Start motor 17 counterclockwise to move portion 45 30 degrees, which will take approximately one second, and stop and hold motor 17. Start vacuum to create downward suction in chamber 6 via pipe 7, start motor 38 counterclockwise effectively turning CD 45 at two hundred and fifty rpm, start motor 54 clockwise at 3500 rpm, start motor 27 to affect upwards movement of CD 45 for approximately two seconds to make contact with buffing pads 51.

The next section will describe the agitation movement of CD 45 using motor 17. Start motor 17 clockwise for 400 steps or approximately two inches at a rate of 1 second to traverse the distance, then reversing in direction for 400 steps or approximately two inches at the rate of one second to traverse the distance, then start motor 17 clockwise 300 steps then counterclockwise 300 steps taking approximately 1.5 seconds for both steps, then continue the same process causing an agitation in the range of 200 steps then the range of 100 steps then loop back to 400 steps and continue this process looping for the entire 15 seconds of grinding.

At the beginning of the agitation movement there also is another range of movement taking place. Hold motor 27 for eight seconds, start motor 27 to enact movement of CD downwards 10 steps, and continue an additional 10 steps downwards every one second for the next seven seconds and then stop motor 17.

The next section will deal with the 6.5 seconds shut down to end the one-minute repair time process.

Start motor 27 to exert movement of CD 45 downwards for two seconds, stop motor 54, stop motor 38, start vacuum. After this process, start motor 17 counterclockwise for three seconds, then start motor 8 counterclockwise, moving portion 58 laterally 90 degrees in approximately 1.5 seconds. At this stage, CD 45 is exposed in chamber 6 and can be removed as a newly repaired CD.

For a two-minute repair time process, up to five-minute repair time process, refer to flowchart FIG. 4 for each additional minute. Other than a one-minute process time, each additional minute starting with the first minute will consist of a 9.5 seconds setup described in FIG. 5, a fifty-second grinding time, until the last minute which will be an exact replica of the one-minute process time which included the buffing process to complete the CD repair. The level of repair time is directly related to the severity of the damage to the optical side of the CD, which will be determined by the user.

The exact amount of pressure to be applied on CD 45 by pads 47 or pads 51 is controlled by a watt meter connected to motor 54 to measure frictional force applied between CD 45 and pads 47 or 51, which in turn changes the amount wattage being measured at motor 54. This is the principal basis to control the exact amount of pressure applied to the CD.

Although the preferred embodiment, as well as the operation and use has been specifically described in relation to the drawings, it should be understood that variation in the preferred embodiment could be achieved by a person skilled in the art without departing from the spirit of the invention. Accordingly, the invention should not be understood to be limited to the exact form revealed in the drawings or the description.

What is claimed is:

1. A refacing system for grinding and polishing the optical side of an optically-read disc, comprising:
    a horizontal platter for holding a disc thereon with the optical side facing up;
    means for controllably rotating the platter about a vertical axis of rotation;
    a grinding pad assembly defining an outer circumferential grinding surface;
    a polishing pad assembly defining an outer circumferential polishing surface;
    a double-shafted motor for rotating the pad assemblies about horizontal axes at high speed;
    a source of grinding compound;
    means for controllably moving the grinding pad assembly and the source of grinding compound toward one another, so that the grinding pad assembly contacts the grinding compound, to transfer some of the grinding compound to the grinding pad assembly;
    means for moving the double-shafted motor so as to alternately engage a circumferential portion of each of the pad assemblies with the disc on the platter, to first grind and then polish the disc;
    means for alternately engaging and disengaging the platter and a pad assembly, to allow a disc to be loaded and unloaded from the platter; and
    means for automatically moving the platter slightly down while grinding, to alter the grinding pressure as grinding progresses.

2. The system of claim 1 further comprising means for varying the contact force between the disc and a pad assembly.

3. The system of claim 1, further comprising means for applying suction around the platter, to remove ground material from the platter area.

4. The system of claim 1, further comprising means for automatically moving the platter slightly down while polishing, to alter the polishing pressure as polishing progresses.

5. The system of claim 1, further comprising a support structure for holding the platform and the source of grinding compound.

6. The system of claim 5, wherein the means for controllably moving the grinding pad assembly and the source of grinding compound toward one another comprises means for moving the support structure up and down.

7. The system of claim 5, wherein the means for controllably rotating the platter comprises a motor supported by the support structure.

8. The system of claim 7, wherein the means for alternately engaging and disengaging the platter and a pad assembly comprises means for moving the support structure up and down.

9. The system of claim 1, further comprising means for moving the platter back and forth in a horizontal plane relative to a pad assembly.

10. The system of claim 1 wherein the source of grinding compound comprises a solid block of compound.

11. A refacing system for grinding and polishing the optical side of an optically-read disc, comprising:
    a horizontal platter for holding a disc thereon with the optical side facing up;
    means for controllably rotating the platter about a vertical axis of rotation;
    a grinding pad assembly defining an outer circumferential grinding surface;
    a polishing pad assembly defining an outer circumferential polishing surface;
    a double-shafted motor for rotating the pad assemblies about horizontal axes at high speed;
    a source of grinding compound;
    means for controllably moving the grinding pad assembly and the source of grinding compound toward one another, so that the grinding pad assembly contacts the grinding compound, to transfer some of the grinding compound to the grinding pad assembly;
    means for moving the double-shafted motor so as to alternately engage a circumferential portion of each of the pad assemblies with the disc on the platter, to first grind and then polish the disc;
    means for alternately engaging and disengaging the platter and a pad assembly, to allow a disc to be loaded and unloaded from the platter;
    means for automatically moving the platter slightly down while grinding, to alter the grinding pressure as grinding progresses;
    means for automatically moving the platter slightly down while polishing, to alter the polishing pressure as polishing progresses;
    a support structure for holding the platform and the source of grinding compound, and wherein the means for controllably moving the grinding pad assembly and the source of grinding compound toward one another comprises means for moving the support structure up and down; and
    means for moving the platter back and forth in a horizontal plane relative to a pad assembly;
    wherein the means for controllably rotating the platter comprises a motor supported by the support structure; and
    wherein the means for alternately engaging and disengaging the platter and a pad assembly comprises means for moving the support structure up and down.

* * * * *